No. 808,514. PATENTED DEC. 26, 1905.
C. H. CRANDALL.
CRUPPER ATTACHMENT.
APPLICATION FILED JAN. 16, 1905.
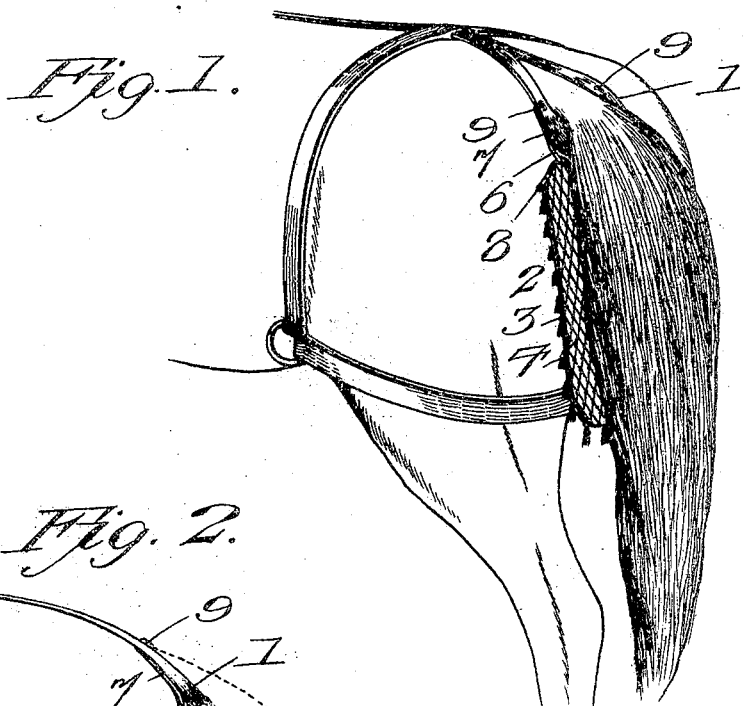
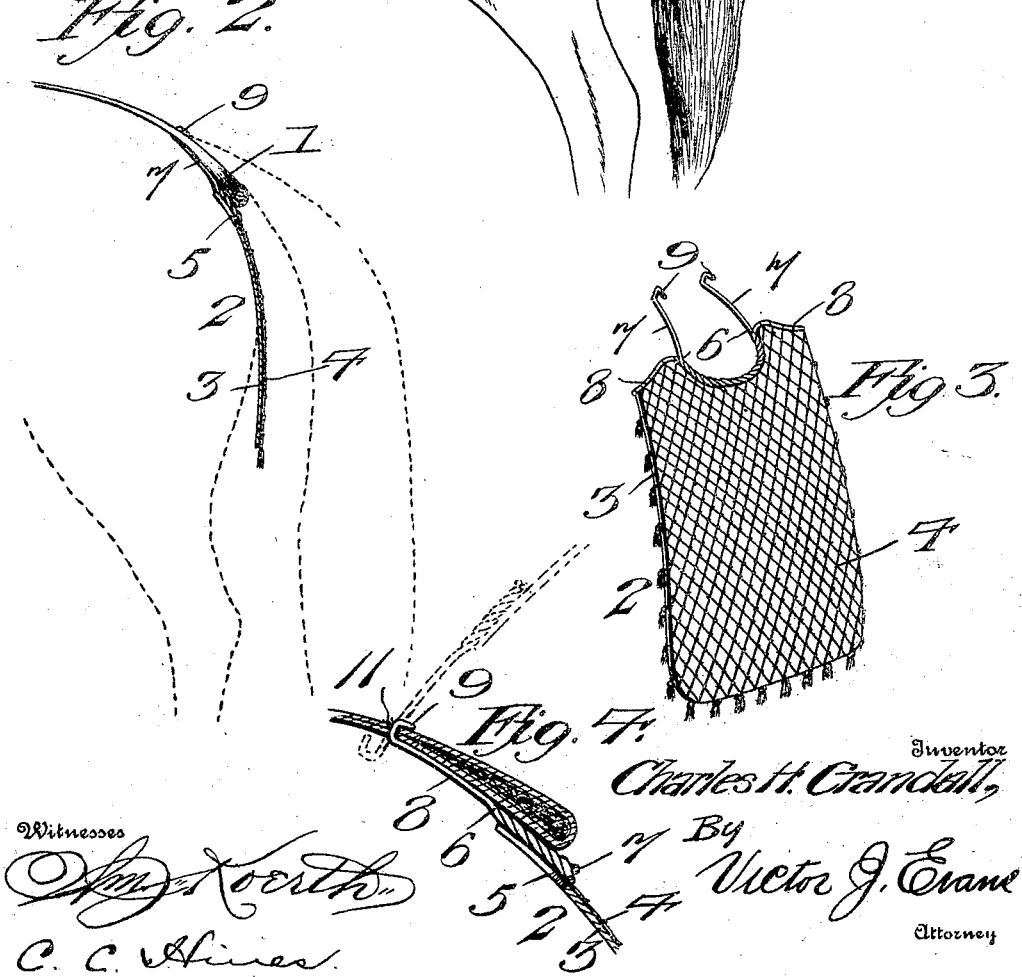

UNITED STATES PATENT OFFICE.

CHARLES H. CRANDALL, OF BALTIMORE, MARYLAND.

CRUPPER ATTACHMENT.

No. 808,514.      Specification of Letters Patent.      Patented Dec. 26, 1905.

Application filed January 16, 1905. Serial No. 241,304.

To all whom it may concern:

Be it known that I, CHARLES H. CRANDALL, a citizen of the United States, residing at 864 West Fayette street, Baltimore, in the State of Maryland, have invented new and useful Improvements in Crupper Attachments, of which the following is a specification.

This invention relates to crupper attachments, and particularly to a blind or shield for concealing the anus of a driving animal, such as a horse, and preventing exposure of the same to the occupants of a vehicle to which the animal is attached when the animal excretes.

The object of the invention is to provide a simple and cheap device of this character which is readily attachable to the crupper of any harness and will serve to prevent exposure as well as scattering of the excretes and soiling of the horse's tail and parts of the vehicle, and which, further, may be easily cleansed and forms an ornamental attachment to a harness.

With this and other objects in view the invention consists of the features of construction, combination, and arrangement of parts hereinafter fully described and claimed, reference being had to the accompanying drawings.

Figure 1 is a perspective view showing the device applied in operative position. Fig. 2 is a central vertical section of the same. Fig. 3 is a perspective view of the shield or blind, detached. Fig. 4 is a longitudinal section through the upper portion of the shield and one of the side portions of the crupper, showing in full lines one of the hooks engaged with the crupper and in dotted lines the mode of disengaging the same therefrom.

The numeral 1 in the drawings represents a crupper, which may be of any ordinary form and attached to the adjacent parts of a harness in the usual manner. The blind or shield 2 is removably attached to the crupper, so as to hang pendent therefrom and cover the hind parts of the animal without interfering with the tail or the free discharge of the excrement. The shield or cover 2 comprises an apron 3 of proper length and width to cover the parts and may be made of oil-cloth or any other suitable imperforate impermeable material which may be washed or otherwise cleansed with facility. The outer side of this apron is covered by a netting 4, which is suitably attached thereto and may be fringed or otherwise attractively furnished to provide an ornamental article.

The upper edges of the apron and netting are properly formed or cut out to produce a recess 5, conforming to the shape of the padded tail-support of the crupper, and are attached to a fastener and supporter comprising a pair of wires 6 and 7, the wires 6 being intermediately curved to conform to the shape of the recess 5 and having its ends turned outward and rearward to form supporting-arms 8. The wire 7 is adapted to lie beneath the crupper and conforms approximately in shape thereto, and its free ends terminate in upwardly and rearwardly directed hooks 9, which are adapted to pass upward through slits or openings 11, formed in the side portions of the crupper, and lie upon the upper surface of the crupper, thus securely and removably fastening the shield thereto. The curved intermediate portions of the wires 6 and 7 are suitably united, as by intertwisting them, as clearly illustrated in Fig. 3.

To apply the blind or shield as thus constructed to any harness-crupper, it is simply necessary to form the slits or openings 11 in the crupper, then to hold the wire 7 at an angle to bring the points of the hooks 9 into register with the slits beneath the crupper, and finally swinging the said wire downward to cause the hooks to pass upward through the slits and bring their bills or points to lie upon the upper faces of the sides of the crupper, as clearly shown in Figs. 1 and 2. A reversal of this movement of the wire 7 will disengage the hooks in an obvious manner, thereby enabling the shield to be readily removed for convenience in cleaning or repairing the same.

It will thus be seen that my invention provides a shield which is simple of construction, inexpensive of manufacture, capable of easy application to any crupper, and which forms an ornamental adjunct to any harness. Owing to the fact that the shield covers the hind parts beneath the tail it will not interfere with the free movement of the tail or discharge of the excrement, but at the same time will conceal the parts from view, and thus obviate unpleasant exposure during the excretion and switching of the tail. By the use of a flexible apron no discomfort to the animal will occur and splattering of the excrement and consequent soiling of the horse's tail and parts of the vehicle will be effectually obviated.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what I claim as new is—

1. An anal shield comprising an apron, a wire frame for supporting said apron, and means for attaching said frame to a crupper.

2. An anal shield comprising an apron, a wire frame for supporting said apron, said frame consisting of two connected wires, one of said wires being attached to the apron and the other having means for connecting it to a crupper.

3. An anal shield comprising an apron and a frame for supporting the same, said frame having a U-shaped portion provided at its free end with upwardly and rearwardly projecting hooks to detachably engage openings in the sides of a crupper.

4. An anal shield comprising an apron provided with a cut-away portion at its upper edge, and a supporting-frame secured to the upper edge of the apron, said frame comprising connected wires, one of said wires being secured to the apron and connected with the other wire, the latter-named wire being U-shaped and provided at its ends with upwardly and rearwardly projecting hooks to detachably engage openings in the sides of a crupper.

5. An anal shield comprising an apron provided at its upper edge with a cut-away portion, a supporting-frame secured thereto, said frame having a U-shaped member partially occupying the cut-away portion and having its arms projecting forwardly therefrom and provided with means to engage the side portions of a crupper.

In testimony whereof I affix my signature in presence of two witnesses.

CHARLES H. CRANDALL.

Witnesses:
H. DITTMAN,
C. C. HINES.